US012539570B2

United States Patent
Ogasawara (10) Patent No.: US 12,539,570 B2
(45) Date of Patent: Feb. 3, 2026

(54) CAM MECHANISM, CAM MECHANISM MANUFACTURING METHOD, CAMSHAFT MANUFACTURING METHOD, NC ROTARY TABLE

(71) Applicant: KITAGAWA IRON WORKS CO., LTD., Fuchu (JP)

(72) Inventor: Tetsuya Ogasawara, Fuchu (JP)

(73) Assignee: KITAGAWA IRON WORKS CO., LTD., Fuchu (JP)

( * ) Notice: Subject to any disclaimer, the term of this patent is extended or adjusted under 35 U.S.C. 154(b) by 0 days.

(21) Appl. No.: 18/836,169

(22) PCT Filed: Feb. 3, 2023

(86) PCT No.: PCT/JP2023/003543
§ 371 (c)(1),
(2) Date: Aug. 6, 2024

(87) PCT Pub. No.: WO2023/149540
PCT Pub. Date: Aug. 10, 2023

(65) Prior Publication Data
US 2025/0162094 A1    May 22, 2025

(30) Foreign Application Priority Data
Feb. 7, 2022 (JP) ................. 2022-017314

(51) Int. Cl.
*B23Q 5/34* (2006.01)
*B23Q 16/06* (2006.01)

(52) U.S. Cl.
CPC ........... *B23Q 5/345* (2013.01); *B23Q 16/065* (2013.01)

(58) Field of Classification Search
CPC ... B23Q 5/341–345; F16H 55/24; F16H 1/16; B23F 13/00–08
See application file for complete search history.

(56) References Cited

U.S. PATENT DOCUMENTS 5,325,634 A * 7/1994 Kobayashi .............. B23F 13/08
451/253
6,386,059 B1 * 5/2002 Mittendorf, Jr. ........ F16H 55/24
74/400
(Continued)

FOREIGN PATENT DOCUMENTS

CN 101705987 A 5/2010
CN 102384220 A 3/2012
(Continued)

OTHER PUBLICATIONS

Extended Search Report issued on Feb. 4, 2025, in corresponding European Application No. 23749856.3, 13 pages.
(Continued)

*Primary Examiner* — Thomas C Diaz
(74) *Attorney, Agent, or Firm* — Maier & Maier, PLLC (57) ABSTRACT

A cam mechanism includes a base, a roller gear, and a camshaft. The roller gear and the camshaft are rotatably supported by the base. The roller gear has a turret and a plurality of cam followers mounted on the circumference of the turret. The camshaft has a shaft portion and a tapered rib having a first tapered rib and a second tapered rib. The first and second tapered ribs are each engaged with the cam followers. The first and second tapered ribs are configured to rotate relative to each other around a rotation axis of the shaft portion during adjustment of preload at which the first and second tapered ribs are pressed against the cam followers. After the adjustment of the preload, the second tapered rib is fixed to the shaft portion, and the first and second tapered ribs are prevented from rotating relatively.

5 Claims, 7 Drawing Sheets

(56) References Cited

U.S. PATENT DOCUMENTS

| | | | | |
|---|---|---|---|---|
| 7,024,740 B2* | 4/2006 | Kato | ..................... | B23Q 1/38 |
| | | | | 74/820 |
| 9,683,653 B2* | 6/2017 | Wu | ..................... | F16H 55/24 |
| 2016/0108991 A1* | 4/2016 | Wu | ..................... | F16H 55/24 |
| | | | | 74/425 |

FOREIGN PATENT DOCUMENTS

| | | | | | |
|---|---|---|---|---|---|
| CN | 106438849 | A | | 2/2017 | |
| CN | 110125723 | A | | 8/2019 | |
| CN | 110273977 | A | | 9/2019 | |
| JP | S6421262 | A | | 1/1989 | |
| JP | 2014224548 | A | | 12/2014 | |
| KR | 20130128817 | A | * | 11/2013 | ............... B23Q 5/56 |
| WO | 2020147175 | A1 | | 7/2020 | |

OTHER PUBLICATIONS

International Search Report issued on Apr. 11, 2023, in corresponding International Application No. PCT/JP2023/003543; 4 pages.

* cited by examiner

Fig.7B

CAM MECHANISM, CAM MECHANISM MANUFACTURING METHOD, CAMSHAFT MANUFACTURING METHOD, NC ROTARY TABLE

TECHNICAL FIELD

The present invention relates to a cam mechanism, a method for manufacturing the cam mechanism, a method for manufacturing a camshaft, and an NC rotary table.

BACKGROUND ART

A roller gear mechanism as disclosed in Patent Literature 1 is known for its high efficiency due to zero-backlash and rolling-contact design, and is thus employed in devices, such as NC rotary tables, used in machine tools.

CITATION LIST

Patent Literature

[Patent Literature 1] Japanese Laid-Open Patent Publication No. 2014-224548

SUMMARY OF INVENTION

Technical Problem

The roller gear cam mechanism eliminates backlash by previously pressing (i.e., preloading) a tapered rib of a camshaft (a roller gear cam in Patent Literature 1) against cam followers at appropriate load. Appropriate preload setting allows proper operation of the roller gear cam mechanism.

In one example, the preload could be adjusted by moving the center axis of the camshaft. Adjustment of the preload by the method, however, causes the center axis of the camshaft to be deviated from the theoretical position, resulting in slight unevenness (fluctuation) in rotation of the turret during one turn of the camshaft. The rotational unevenness reduces index accuracy when the roller gear cam mechanism is used in NC rotary tables, etc.

In view of the foregoing, the present invention provides a cam mechanism that allows preload adjustment without moving the center axis of a camshaft.

Solution to Problem

According to the present invention, the inventions below are provided.

[1] A cam mechanism comprising a base, a roller gear, and a camshaft, wherein:
  the roller gear and the camshaft are rotatably supported by the base;
  the roller gear has a turret and a plurality of cam followers mounted on the circumference of the turret;
  the cam shaft has a tapered rib having a first tapered rib and a second tapered rib, and a shaft portion;
  the first and second tapered ribs are each engaged with the cam followers;
  the first and second tapered ribs are configured to rotate relative to each other around a rotation axis of the shaft portion during adjustment of preload at which the first and second tapered ribs are pressed against the cam followers; and
  after the adjustment of the preload, the second tapered rib is fixed to the shaft portion, and the first and second tapered ribs are prevented from rotating relatively.

[2] The cam mechanism of [1], wherein:
  the camshaft has a first camshaft member, a second camshaft member, and a fastening member;
  the first camshaft member is a member in which the shaft portion and the first tapered rib are integrally formed;
  the second camshaft member is a member having a second tapered rib and a through hole;
  the first and second camshaft members are connected rotatably relative to each other around the rotation axis of the shaft portion by inserting the shaft portion into the through hole; and
  the fastening member is configured to allow switching between fastening and unfastening of the shaft portion and the second camshaft member.

[3] The cam mechanism of [1] or [2], wherein:
  the camshaft has an axial movement preventing member; and
  the axial movement preventing member is configured to prevent the first and second tapered ribs in contact with each other from moving axially relative to each other.

[4] The cam mechanism of any one of [1] to [3], wherein:
  the camshaft is rotatably supported at an end by a holder; and
  the holder is fixed to the base so as to allow adjustment of the axial position of the camshaft.

[5] A method for manufacturing the cam mechanism of any one of [1] to [4], comprising an engagement process and a preload adjustment process, wherein:
  in the engagement process, the first and second tapered ribs and the cam followers are rendered in an engaged state in which the first and second tapered ribs and the cam followers are engaged with each other; and
  in the preload adjustment process, the preload is adjusted based on torque applied to rotate the first and second tapered ribs relative to each other in the engaged state.

[6] A method for manufacturing a camshaft, comprising a preparation process, a combination process, and a tapered rib forming process, wherein:
  in the preparation process, a first camshaft member having a shaft portion and a first tapered rib forming portion, and a second camshaft member having a through hole and a second tapered rib forming portion are prepared;
  in the combination process, the first and second camshaft members are combined by inserting the shaft portion into the through hole and bringing the first and second tapered rib forming portions into contact with each other; and
  in the tapered rib forming process, the first and second tapered ribs are continuously formed on the respective first and second tapered rib forming portions with the first and second tapered rib forming portions in contact with each other.

[7] An NC rotary table comprising a motor, a cam mechanism, and a rotary table, wherein:
  the cam mechanism is the cam mechanism of any one of [1] to [4];
  the motor is configured to allow rotation of the camshaft; and the NC rotary table is configured to rotate with rotation of the turret.

Advantageous Effects of Invention

In the cam mechanism of the invention, the camshaft has the first and second tapered ribs, and the preload can be adjusted by rotating the first and second tapered ribs relative to each other around the axis of rotation of the shaft portion. The cam mechanism of the present invention thus allows preload adjustment without moving the center axis of the camshaft, thereby preventing problems to be caused by the deviation of the center axis of the camshaft from its theoretical position. Also, since the torque applied to rotate the first and second tapered ribs relative to each other correlates with preloading load, the preloading load can be managed by managing the torque, and the effort required to manage the preloading load is thus reduced. After the preload adjustment, in addition, the second tapered rib is fixed to the shaft portion, and the first and second tapered ribs are prevented from rotating relatively. After the preload adjustment, thus, the first and second tapered ribs are prevented from rotating, and appropriate preload is maintained.

BRIEF DESCRIPTION OF DRAWINGS

FIGS. 6A to 6D are front views of a manufacturing process for a camshaft 8.

DESCRIPTION OF EMBODIMENTS

Hereinafter, the embodiments of the present invention will be described with reference to the drawings. The characteristic matters shown in the embodiments described below can be combined with each other. Moreover, each characteristic matter independently constitutes an invention.

1. Configuration of NC Rotary Table 1 and Cam Mechanism 3

Referring to FIGS. 1 to 7, an NC rotary table 1 according to an embodiment of the invention includes a motor 2, a cam mechanism 3, and a rotary table 4. The motor 2 is covered with a motor case 5.

Figure 1:
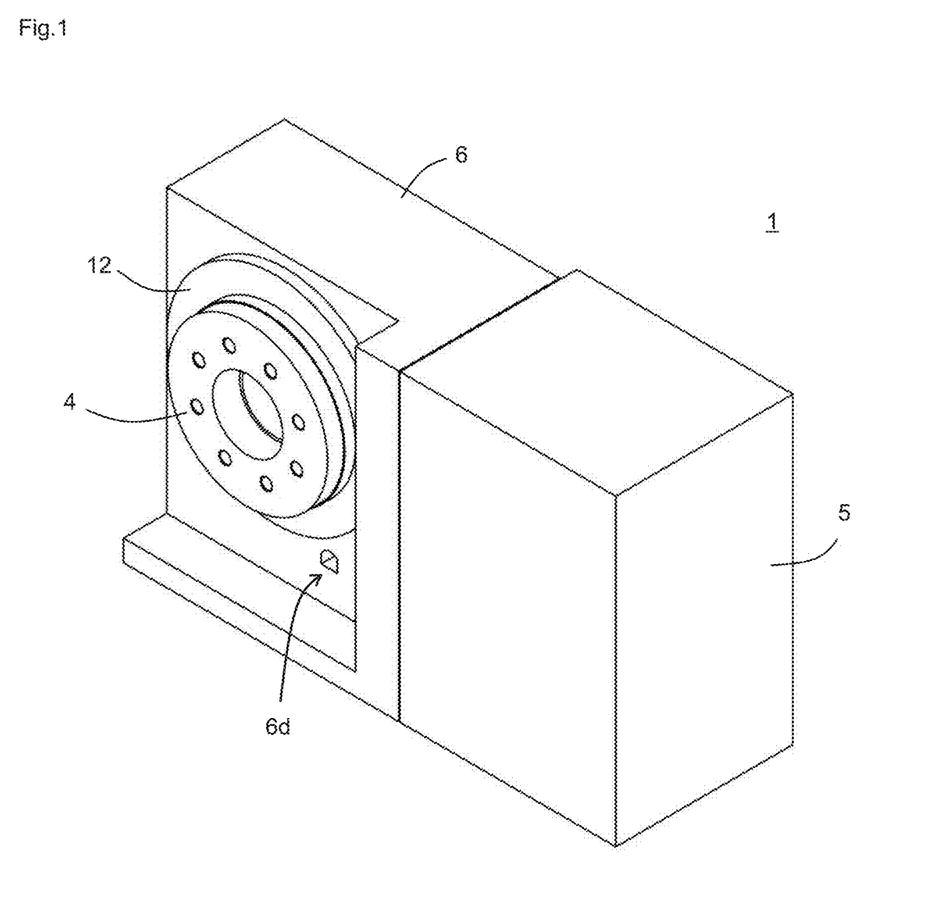
FIG. 1 is a perspective view of an NC rotary table 1 of one embodiment of the invention.
Figure 2A:
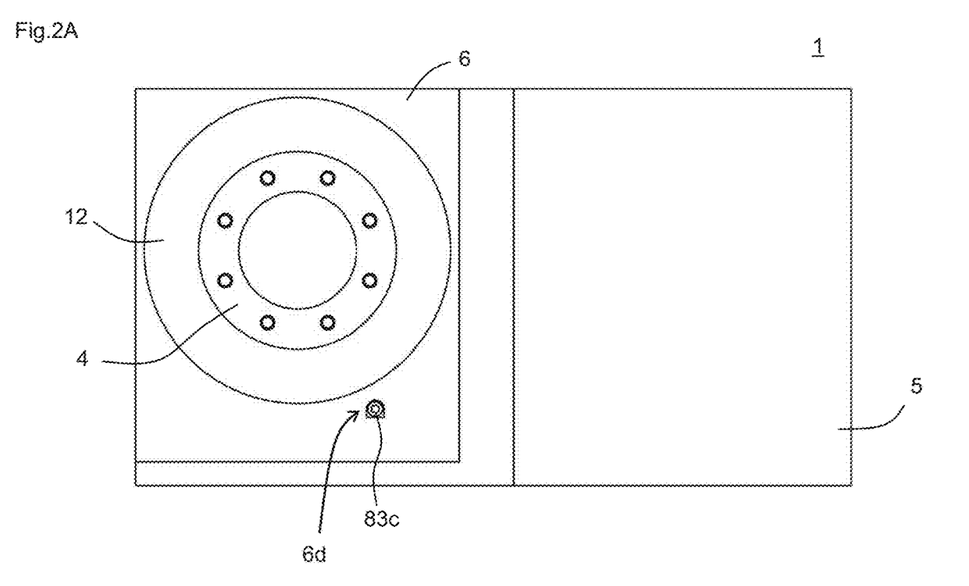
FIG. 2A is a front view of the NC rotary table 1 of FIG. 1.
Figure 2B:
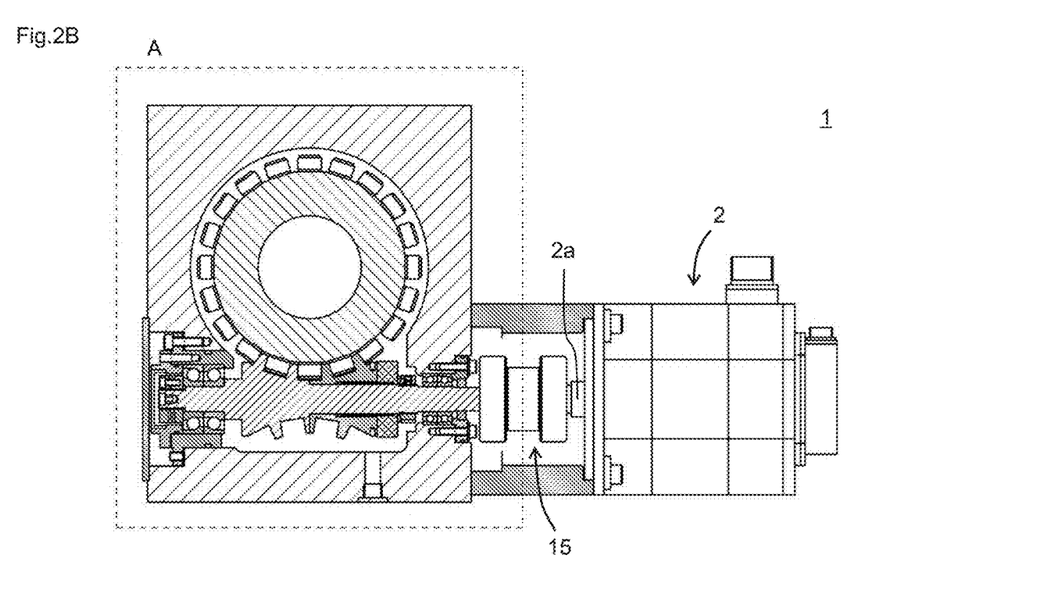
FIG. 2B is a cross-sectional view of a base 6 and its internal components cut in a plane parallel to the surface of the paper through the center of a shaft portion 8b, with a motor case 5 removed from FIG. 2A.
Figure 3:
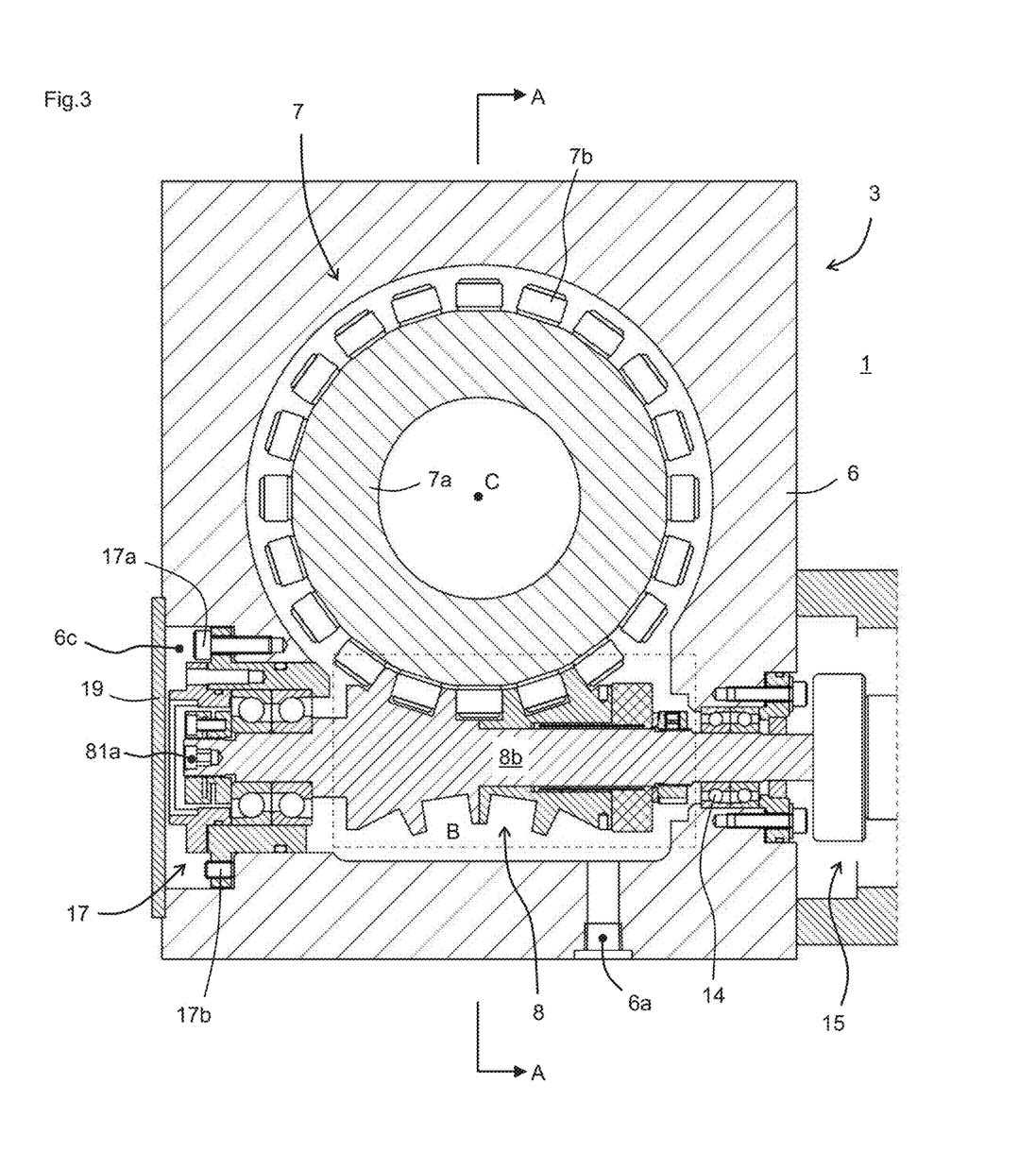
FIG. 3 is an enlarged view of area A in FIG. 2B.
Figure 5:
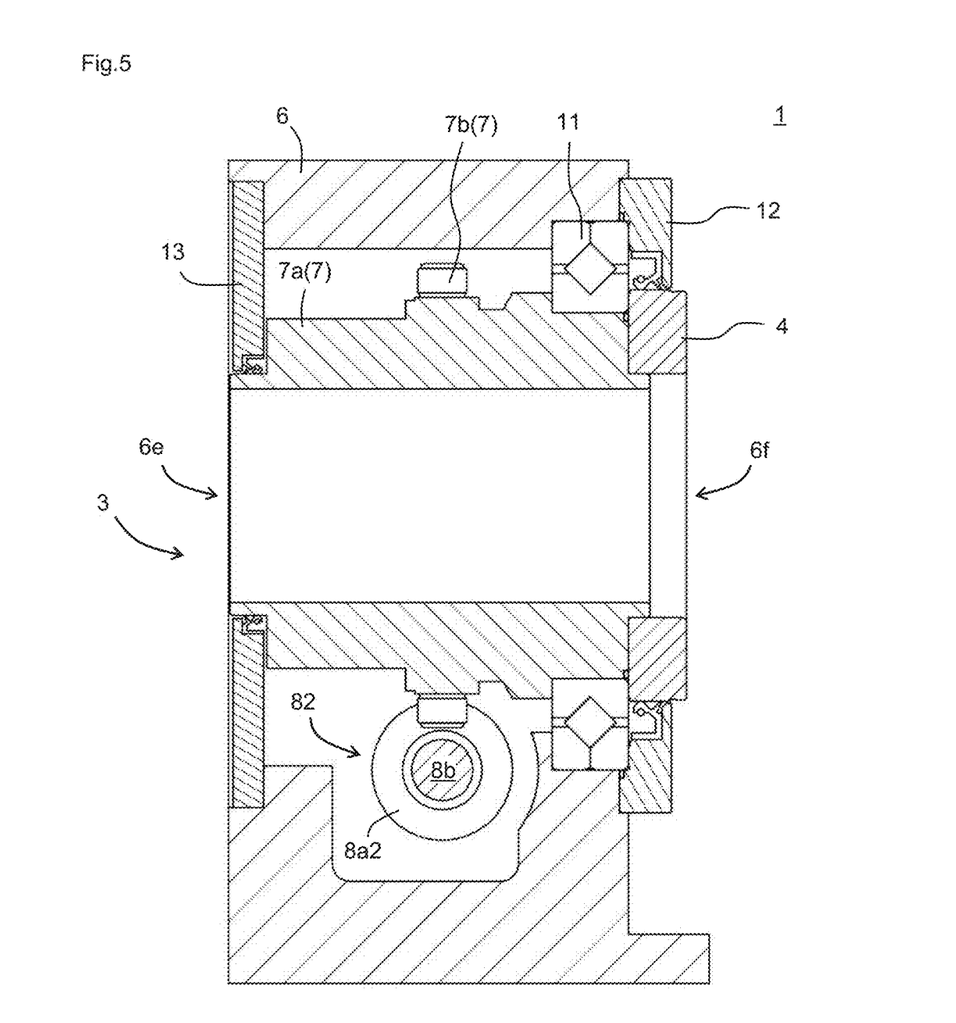
FIG. 5: is a cross-sectional view of A-A in FIG. 3. A second taper rib 8a2 is shown in simplified form.

Referring to FIGS. 2, 3 and 5, rotation of a motor shaft 2a of the motor 2 is transmitted through the cam mechanism 3 to the rotary table 4 to rotate the rotary table 4. An unshown workpiece can be mounted on the rotary table 4, and rotating the rotary table 4 with the workpiece mounted thereon brings the workpiece into a desired working position. This allows tools of NC working machines to be pressed against the workpiece at a desired angle, resulting in shortened working time and improved working efficiency.

Figure 4:
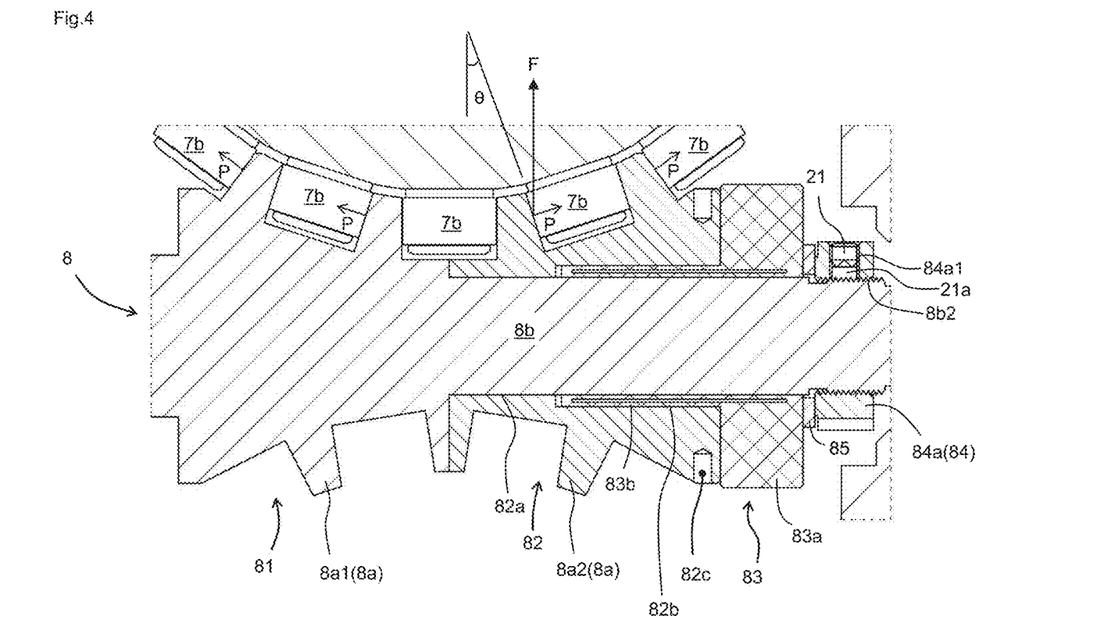
FIG. 4 is an enlarged view of area B in FIG. 3.

Referring to FIGS. 3 to 4, the cam mechanism 3 has a base 6, a roller gear 7, and a camshaft 8. The roller gear 7 and the camshaft 8 are rotatably supported by the base 6. A rotation axis of the roller gear 7 extends in a direction perpendicular to the plane in FIG. 3, and a rotation axis the camshaft 8 extends in a horizontal direction in FIG. 3. Thus, the rotation axis of the roller gear 7 extends in a direction perpendicular to the rotation axis of the camshaft 8. The cam mechanism 3 converts rotational motion of the camshaft 8 into rotational motion of the roller gear 7, and can also be referred to as a roller gear cam mechanism.

Referring to FIG. 3, the roller gear 7 has a turret 7a and a plurality of cam followers 7b mounted on the circumference of the turret 7a. The cam followers 7b are preferably arranged radially at equal intervals. The cam followers 7b are rotatable, and the directions of rotation axes thereof preferably coincide with the respective directions of straight lines from the rotation center of the turret 7a to the cam followers 7b. Accordingly, the rotation axis of each cam follower 7b preferably extends perpendicular to the rotation axis of the turret 7a.

Referring to FIG. 5, the turret 7a is rotatably supported by a bearing 11, and the rotary table 4 is fixed to a front side of the turret 7a. Thus, the rotary table 4 rotates concentrically as the turret 7a rotates. On a front side of the base 6 (right side of FIG. 5), a fixing outer ring portion 12 is provided so as to cover the bearing 11. The fixing outer ring portion 12 is fixed to the base 6, thereby allowing the bearing 11 to be fixed to the base 6. The bearing 11 is preferably a cross-roller bearing. If the bearing 11 has bolt fixing holes, the bearing 11 may be fixed to the base 6 without using the fixing outer ring portion 12.

A rear plate 13 is provided on a rear side of the base 6 (left side of FIG. 5). Detachment of the rear plate 13 allows checking of engagement status of the first and second tapered ribs 8a1 and 8a2 and the cam followers 7b, and the like, through an opening 6e provided on the rear side of the base 6.

Referring to FIG. 4, the camshaft 8 has a tapered rib 8a and a shaft portion 8b. The tapered rib 8a has a first tapered rib 8a1 and a second tapered rib 8a2. The first and second tapered ribs 8a1 and 8a2 are respectively engaged with separate cam followers 7b. The tapered rib 8a is configured to shift in phase in the axial direction of the camshaft 8 as the camshaft 8 rotates. The rotation of the camshaft 8 allows sequential engagement of the tapered rib 8a with the cam followers 7b, and is thereby transmitted to the roller gear 7. The first and second tapered ribs 8a1 and 8a2, into which the tapered rib 8 is divided, are configured during preload adjustment to rotate relative to each other coaxially around the rotation axis of the shaft portion 8b.

As the camshaft 8 rotates, the tapered rib 8a is pressed against the cam followers 7b, thereby causing the roller gear 7 to rotate. The presence of backlash between the tapered rib 8a and the cam followers 7b reduces positioning speed and accuracy, and it is thus preferable to eliminate the backlash by previously pressing (i.e., preloading) the tapered rib 8a against the cam followers 7b at appropriate load.

If the tapered rib 8*a* is not divided, as in Patent Literature 1, the preload can be adjusted, in one example, by moving the entire camshaft 8 closer to the cam followers 7*b*. In this case, let θ (as shown in FIG. 4) be the angle between the vertical plane and a side surface of a cam follower 7*b*, and let F be the force with which to press the camshaft 8 against the cam follower 7*b* (force in the upward direction on FIG. 4). Preloading load P generated by the force F is F sin θ, and the value depends on θ. Thus, the magnitude of preload varies depending on the circumferential position of the cam follower 7*b*. Also, if the entire camshaft 8 is moved closer to the cam followers 7*b*, the center axis of the camshaft 8 is deviated from its theoretical position. This causes slight unevenness (fluctuation) in rotation of the turret 7*a* during one turn of the camshaft 8, and the rotational unevenness reduces index accuracy when the roller gear cam mechanism is used in NC rotary tables, etc.

In contrast, when the tapered rib 8*a* is divided, as in the present embodiment, the preload can be adjusted by rotating the first and second tapered ribs 8*a*1 and 8*a*2 relative to each other with the first and second tapered ribs 8*a*1 and 8*a*2 engaged with the cam followers 7*b* and by shifting angular phase between the first and second tapered ribs 8*a*1 and 8*a*2. Since the preload can be thus adjusted without moving the center axis of the camshaft 8, problems to be caused by the deviation of the center axis of the camshaft 8 from its theoretical position can be prevented. Also, the camshaft 8 arranged in its theoretical position allows the tapered rib 8*a* to have even and accurate contact with the cam followers 7*b* during one turn of the camshaft 8. In addition, the even and accurate contact with the cam followers 7*b* allows constant preload to be applied to the cam followers 7*b*. The constant preload allows longer life of the cam followers 7*b* or application of a larger external load. Furthermore, the constant preload reduces collision noise and vibration that are generated when the cam followers 7*b* are engaged with the tapered rib 8*a*.

The tapered rib 8*a* is formed so as to be uniformly displaced in a circumferential direction of the turret 7*a* as the camshaft 8 rotates. Referring to FIG. 4, thus, load (indicated by arrow P) to be applied to each cam follower 7*b* by the relative rotation of the first and second tapered ribs 8*a*1 and 8*a*2 is constant regardless of the position of the cam follower 7*b* with respect to the circumferential direction of the turret 7*a* (i.e., the circumferential direction of rotation about the center C of the turret 7*a*).

Since the torque applied to rotate the first and second tapered ribs 8*a*1 and 8*a*2 relative to each other correlates with the preloading load, the preloading load can be managed by managing the torque, and the effort required to manage the preloading load is thus reduced. The torque can be managed with a torque management tool such as a torque wrench. Also, the tapered rib 8*a* is configured after the preload adjustment to allow the second tapered rib 8*a*2 to be fixed to the shaft portion 8*b* and to disable the relative rotation of the first and second tapered ribs 8*a*1 and 8*a*2. After the preload adjustment, the first and second tapered ribs 8*a*1 and 8*a*2 is prevented from rotating relative to each other, and appropriate preload is thus maintained.

Referring to FIG. 4, the camshaft 8 preferably has a first camshaft member 81, a second camshaft member 82, and a fastening member 83. The first camshaft member 81 is a member into which the shaft portion 8*b* and the first tapered rib 8*a*1 are integrally formed. The second camshaft member 82 has the second tapered rib 8*a*2 and a through hole 82*a*. The shaft portion 8*b* is inserted into the through hole 82*a*, thereby connecting the first and second camshaft members 81 and 82 rotatably relative to each other. An outer circumferential surface of the shaft portion 8*b* guides at least a portion of an inner circumferential surface of the through hole 82*a*, and the shaft portion 8*b* arranged in the through hole 82*a* allows coaxial positioning of the first and second camshaft members 81 and 82.

When the first and second tapered ribs 8*a*1 and 8*a*2 are rotated relative to each other, the first camshaft member 81 is preferably rotated while the second camshaft member 82 is prevented from rotating. Preferably, the second camshaft member 82 has a drilled hole 82*c*, and the base 6 has an opening 6*a* adjacent (preferably opposite) to the drilled hole 82*c*, as illustrated in FIG. 3. A pin or other fixing tool inserted into the drilled hole 82*c* through the opening 6*a* prevents rotation of the second camshaft member 82. The opening 6*a* is preferably provided on a bottom surface of the base 6. The first camshaft member 81 can be rotated, for example, by inserting a hexagonal bar wrench into a hexagonal socket 81*a* provided in an end surface thereof, as illustrated in FIG. 3. The first camshaft member 81 can also be rotated by engaging two engageable surfaces thereof with the wrench. The first camshaft member 81 can preferably be rotated by inserting a tool into the base 6 through an opening 6*c* provided in a side surface of the base 6.

Referring to FIG. 4, the fastening member 83 is configured to switch between fastening and unfastening of the shaft portion 8*b* and the second camshaft member 82. When the fastening member 83 is in an unfastening state, the first and second camshaft members 81 and 82 can rotate relative to each other, and in this state, the preload can be adjusted by the method described above. When the fastening member 83 fastens the shaft portion 8*b* and the second camshaft member 82 after the preload adjustment, relative rotation of the first and second camshaft members 81 and 82 is prevented, and appropriate preload as adjusted is maintained.

The fastening member 83 preferably has a flange 83*a* and a sleeve 83*b* connected to each other. The sleeve 83*b* is arranged in a sleeve arrangement space 82*b* provided between the outer circumferential surface of the shaft portion 8*b* and the inner circumferential surface of the through hole 82*a*. The sleeve arrangement space 82*b* is preferably constructed by a recess formed in an inner surface of the through hole 82*a*. An inner circumferential surface of the sleeve 83*b* is guided by the outer circumferential surface of the shaft portion 8*b*. Fastening and unfastening by the fastening member 83 is achieved by displacing or deforming the sleeve 83*b*, with the sleeve 83*b* arranged in the sleeve arrangement space 82*b*, by operating an operating portion 83*c* (as illustrated in FIG. 2*a*) provided on the flange 83*a*. The operating portion 83*c* can preferably be operated through an adjustment hole 6*d* provided in the base 6. The adjustment hole 6*d* is preferably provided on a front side of the base 6.

The flange 83*a* is a portion that extends outward in the radial direction, and the operating portion 83*c* is preferably provided on the flange 83*a*. Referring to FIG. 4, a side surface of the flange 83*a* is preferably in contact with an end surface of the second camshaft member 82.

In one example, the fastening member 83 is of hydraulic type, and is brought into a fastening state by expanding the sleeve 83*b* through pressurization of a pressure medium (e.g., oil) sealed in the sleeve 83*b* with operation of the operating portion 83*c*. The fastening member 83 is brought back into an unfastening state by releasing the pressurization of the pressure medium. In another example, the fastening member 83 has a configuration including a bolt, and rotation of the bolt allows switching between fastening and unfastening by the fastening member 83.

In still another example, the fastening member 83 is of mechanical type, such as locking rings, which realizes fastening and unfastening by the action of wedges.

The camshaft 8 preferably has an axial movement preventing member 84. The axial movement preventing member 84 is configured to prevent the first and second tapered ribs 8a1 and 8a2 in contact with each other from moving axially relative to each other. If the first and second tapered ribs 8a1 and 8a2 are axially movable relative to each other when the first and second tapered ribs 8a1 and 8a2 are rotated relatively, the first and second tapered ribs 8a1 and 8a2 may move relatively in a direction away from each other, causing a gap to be formed therebetween. In the present embodiment, the axial movement preventing member 84 is provided to prevent a gap from being formed between the first and second tapered ribs 8a1 and 8a2 when the first and second taper ribs 8a1 and 8a2 are rotated relatively.

The fastening member 83 is preferably positioned between the second camshaft member 82 and the axial movement preventing member 84. The axial movement preventing member 84 preferably prevents axial relative movement of the first and second camshaft members 81 and 82 by pressing the fastening member 83 with a slight load to bring the first and second camshaft members 81 and 82 into contact with each other.

Preferably, the shaft portion 8b has a male thread portion 8b2, and the axial movement preventing member 84 is a locking nut 84a to be screwed onto the male thread portion 8b2. The locking nut 84a is rotated to be arranged in a proper position. In that state, a locking screw 21 is screwed into a threaded hole 84a1 provided on an outer circumferential surface of the locking nut 84a, and a copper alloy bush 21a placed at the tip of the locking screw 21 is deformed to close the gap with the male thread portion 8b2. Thus, the locking nut 84a is prevented from rotating and fixed to the shaft portion 8b.

A spacer 85 is preferably arranged between the fastening member 83 and the locking nut 84a. If there are restrictions on the location of the male thread portion 8b2, the locking nut 84a may not be arranged sufficiently close to the fastening member 83. In such cases, the spacer 85 allows transmission of pressure from the locking nut 84a to the fastening member 83.

Figure 7A:
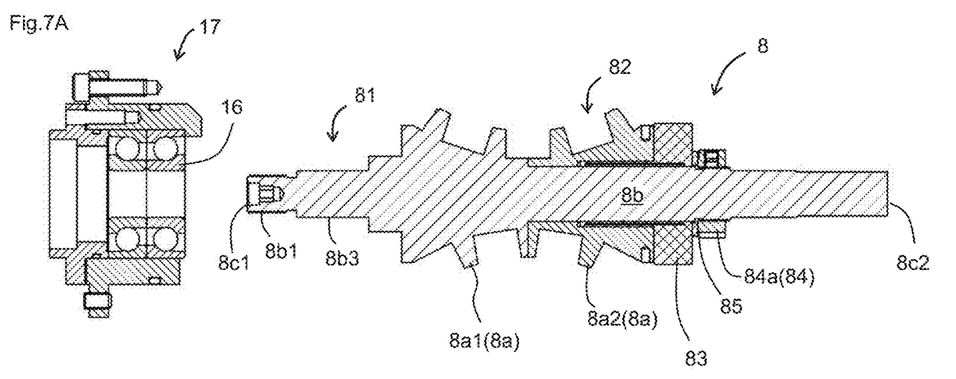
FIG. 7A shows a state of the camshaft 8 and a holder 17 in FIG. 3 after they are extracted and separated from each other.

Referring to FIG. 7A, the camshaft 8 has a first end 8c1 and a second end 8c2. The tapered rib 8a is arranged between the first end 8c1 and the second end 8c2. At the second end 8c2, referring to FIG. 3, the camshaft 8 is preferably supported rotatably through a bearing 14 by the base 6, and connected through a coupling 15 to the motor shaft 2a. The other end 8c2 side is preferably connected to the motor shaft 2a via a coupling 15. This allows the camshaft 8 to rotate with the rotation of the motor shaft 2a.

At the first end 8c1, referring to FIG. 7A, the camshaft 8 is preferably supported rotatably through a bearing 16 by a holder 17. Referring to FIG. 3, the holder 17 is fixed to the base 6. Thus, the camshaft 8 is rotatably supported at the first end 8c1 through the holder 17 by the holder 17. The holder 17 is preferably fixed to the base 6 so as to allow adjustment of axial position of the camshaft 8. This configuration facilitates adjustment of the axial position of the camshaft 8, thereby reducing the labor required for assembly of the cam mechanism 3. This configuration also allows the camshaft 8 to be moved only in the axial direction thereof, thereby facilitating arrangement of the camshaft 8 in the theoretical position of the roller gear cam mechanism.

Figure 7B:
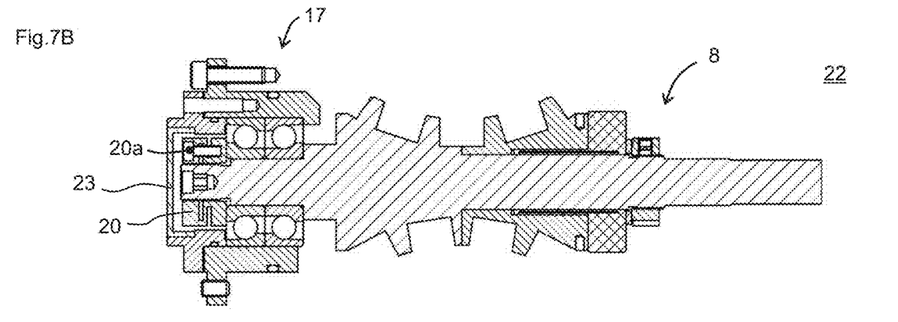
FIG. 7B shows a state of the camshaft 8 and the holder 17 from the state of FIG. 7A after they are connected with a fixing nut 20.

On a side of the first end 8c1, referring to FIG. 7A, the shaft portion 8b preferably has a male thread portion 8b1, and a supported portion 8b3 to be supported by the bearing 16. The supported portion 8b3 is arranged between the male thread portion 8b1 and the tapered rib 8a. With the supported portion 8b3 supported by the bearing 16, a fixing nut 20 is screwed onto the male thread portion 8b1, as illustrated in FIG. 7B, thereby allowing the camshaft 8 to be fixed to the holder 17. The fixing nut 20 is prevented from loosening by being tightened with a bolt inserted into a threaded hole 20a.

Referring to FIG. 3, a side plate 19 is provided on the side surface of the base 6. Removal of the side plate 19 allows the camshaft 8 and holder 17 to be inserted into the base 6 through the opening 6c.

2. Method for Manufacturing Camshaft 8

In a roller gear cam mechanism, it is extremely important to form the tapered rib 8a accurately in order to reduce unevenness in rotation of the turret. Since the tapered rib 8a is divided into the first and second tapered ribs 8a1 and 8a2 in the present embodiment, however, it is not easy to form the taper rib 8a accurately.

Therefore, a method for manufacturing the camshaft 8 is described below that enables accurate formation of the tapered rib 8a.

A method for manufacturing the camshaft 8 of an embodiment of the present invention includes a preparation process, a combination process, and a tapered rib forming process.

Figure 6A:
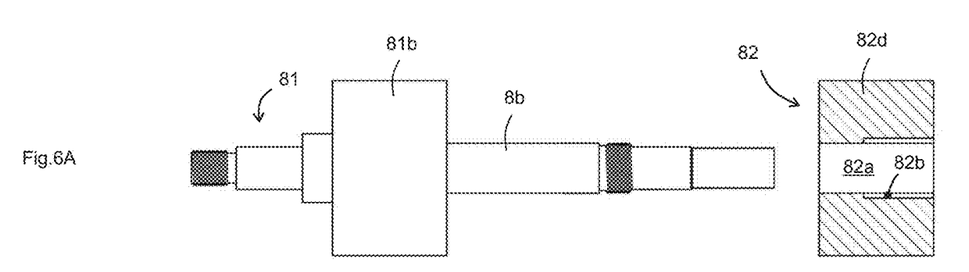
FIG. 6A shows first and second camshaft members 81, 82 separated before forming first and second taper ribs 8a1, 8a2.

In the preparation process, referring to FIG. 6A, the first camshaft member 81 having the shaft portion 8b and a first tapered rib forming portion 81b, and the second camshaft member 82 having the through hole 82a and a second tapered rib forming portion 82d are prepared.

Figure 6B:
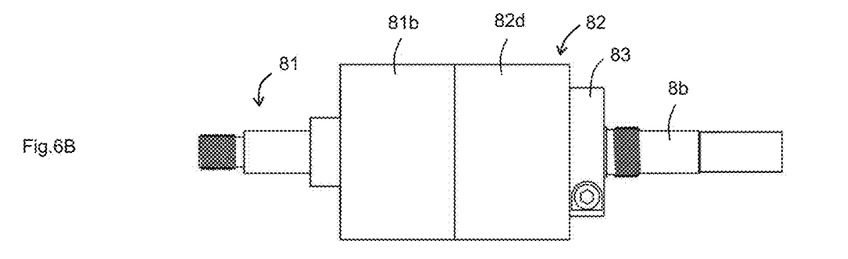
FIG. 6B shows the first and second camshaft members 81, 82 assembled from the state of FIG. 6A.

In the combination process, then, the first and second camshaft members 81 and 82 are combined by arranging the shaft portion 8b inside the through hole 82a and bringing the first and second tapered rib forming portions 81b and 82d into contact with each other, as illustrated in FIG. 6B. At this time, the first and second camshaft members 81 and 82 are preferably fixed so as not to rotate relative to each other. Relative rotation of the first and second camshaft members 81 and 82 may be prevented by rendering the fastening member 83 in a fastening state, or by using an additional jig.

Figure 6C:
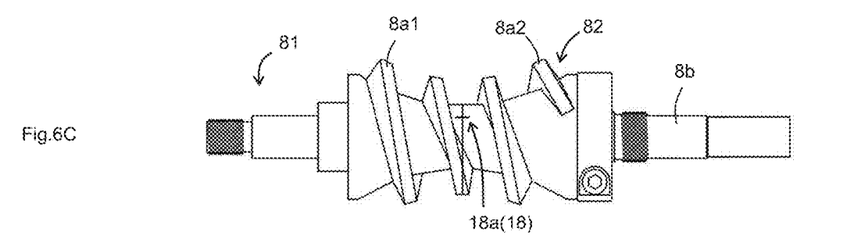
FIG. 6C shows a state after the first and second taper ribs 8a1, 8a2 are formed from the state of FIG. 6B.

In the tapered rib forming process, finally, the first and second tapered ribs 8a1 and 8a2 are continuously formed on the respective first and second tapered rib forming portions 81b and 82d with the first and second tapered rib forming portions 81b and 82d in contact with each other, as illustrated in FIGS. 6B and 6C. Thus, the tapered rib 8a can be formed accurately by forming the first and second tapered ribs 8a1 and 8a2 continuously instead of separately.

The first and second tapered ribs 8a1 and 8a2 are formed by cutting or the like. Since cutting chips may enter therebetween, the first and second camshaft members 81 and 82 are preferably separated and cleaned.

Figure 6D:
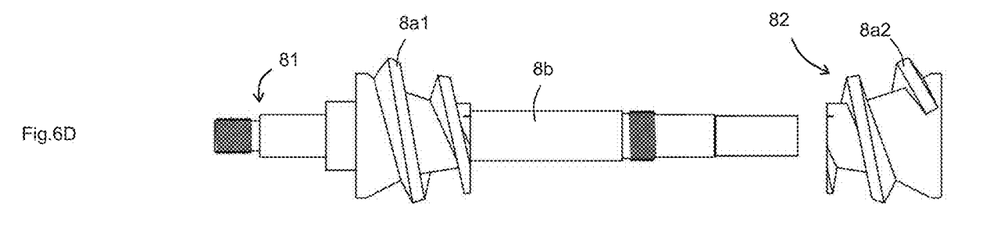
FIG. 6D shows a state after the first and second camshaft members 81, 82 are separated from the state of FIG. 6C.

When the first and second camshaft members 81 and 82 are to be reassembled after separation, on the other hand, circumferential alignment of the first and second camshaft members 81 and 82 may not be easy in some cases. In a separation process of the method, thus, the first and second camshaft members 81 and 82 are preferably marked before separation from each other with a mark 18 that allows the first and second camshaft members 81 and 82 to be circumferentially aligned with each other, as illustrated in FIGS. 6C and 6D. The mark 18 is preferably a matchmark 18a formed across the first and second camshaft members 81 and 82.

3. Method for Manufacturing the Cam Mechanism 3

Described below is a method for manufacturing the cam mechanism 3. The method for manufacturing the cam mechanism 3 of an embodiment of the invention includes an engagement process and a preload adjustment process.

In the engagement process, the first and second tapered ribs 8a1 and 8a2 and the cam followers 7b are rendered in an engaged state in which the first and second tapered ribs 8a1 and 8a2 and the cam followers 7b are engaged with each other, as illustrated in FIGS. 3 and 4. In the preload adjustment process, then, the preload is adjusted based on torque used to rotate the first and second tapered ribs 8a1 and 8a2 relative to each other in the engaged state as mentioned above. The method allows preload adjustment with a torque management tool such as a torque wrench, thereby reducing the effort required for adjustment work.

4. Detailed Method for Manufacturing NC Rotary Table 1 and Cam Mechanism 3

The NC rotary table 1 and the cam mechanism 3 is manufactured by the procedure as described in more detail below.

(1) Unit Assembly Process

In a unit assembly process, a camshaft unit 22, in which the camshaft 8 and the holder 17 are connected, is assembled outside the base 6. This process is preferably be performed in the following steps.

First, referring to FIG. 7A, the second camshaft member 82, the fastening member 83, the spacer 85, and the axial movement preventing member 84 are mounted on the side of the second end 8c2 of the shaft portion 8b of the first camshaft member 81 in the mentioned order. The spacer 85 can be omitted if unnecessary.

Then, the second camshaft member 82 is pressed by the axial movement preventing member 84 to bring the end surfaces of the first and second camshaft members 81 and 82 into close contact with each other, and the axial movement preventing member 84 is fixed to the shaft portion 8b in that state.

With the fastening member 83 in the unfastening state, next, the first and second camshaft members 81 and 82 are aligned so as to be in phase with each other, and the fastening member 83 is then rendered into the fastening state.

Then, the holder 17 is attached to the side of the first end 8c1 of the shaft portion 8b, the fixing nut 20 is screwed onto the male thread 8b1, and the bolt inserted into the threaded hole 20a is tightened to fix the fixing nut 20. The holder 17 may be fitted with a seal cap 23 to prevent lubricant leakage.

The camshaft unit 22 with the camshaft 8 and the holder 17 connected therein is assembled in the foregoing process.

(2) Engagement Process

In an engagement process, the camshaft unit 22 and the roller gear 7 are mounted on the base 6, and the first and second tapered ribs 8a1 and 8a2 and the cam followers 7b are rendered in the engaged state in which the first and second tapered ribs 8a1 and 8a2 and the cam followers 7b are engaged with each other. This process is preferably performed in the following steps.

First, referring to FIGS. 3 and 5, the bearing 14 is attached to the base 6. Then, the camshaft unit 22 is inserted through the opening 6c into the base 6 and supported at the second end 8c2 by the bearing 14, and the holder 17 is fixed to the base 6. The holder 17 has a fixing bolt 17a and an adjustment stopper bolt 17b. Position of the holder 17 is adjusted by adjusting the amount of protrusion of the stopper bolt 17b. The holder 17 allows adjustment of only the axial position of the camshaft 8, and thus facilitates adjustment of the camshaft 8 to the theoretical position.

The first and second camshaft members 81 and 82 is rendered rotatable by fixing the first camshaft member 81 in the theoretical position and releasing fastening by the fastening member 83. Referring to FIG. 2A, the fastening by the fastening member 83 can be released by operating the operation portion 83c with a tool, such as a hexagonal bar wrench, inserted into the base 6 through the adjustment hole 6d provided in the base 6.

Through an opening 6f (illustrated in FIG. 5) provided on the front side of the base 6, next, the roller gear 7 with the bearing 11 attached thereto is inserted into the base 6, and the first and second tapered ribs 8a1 and 8a2 and the cam followers 7b are rendered in the engaged state in which the first and second tapered ribs 8a1 and 8a2 and the cam followers 7b are engaged with each other. Then, the bearing 11 is fixed to the base 6 by fixing the fixing outer ring portion 12 to the base 6.

(3) Preload Adjustment Process

Through the opening 6a illustrated in FIG. 3, next, a pin is inserted into the drilled hole 82c of the second camshaft member 82 to prevent rotation of the second camshaft member 82, and, in that state, the first camshaft member 81 is rotated, with a torque wrench through the hexagonal socket 81a provided in the end surface thereof, in a direction in which peaks of the first and second tapered ribs 8a1 and 8a2 depart from each other. This allows the tapered rib 8a to be uniformly and constantly displaced in the circumferential direction of the turret 7a, and thereby allows application of constant preload to the cam followers 7b. The preload can be managed by using a torque wrench. With constant preload applied, the fastening member 83 is rendered in the fastening state, and the first and second camshaft members 81 and 82 are fixed.

The foregoing process allows the cam mechanism 3 with appropriately set preload to be manufactured. Consequently, the NC rotary table 1 is manufactured by mounting the rotary table 4 on the turret 7a and connecting the shaft portion 8b and the motor shaft 2.

5. Other Embodiments

In the foregoing embodiment, the first camshaft member 81 is a member in which the shaft portion 8b and the first tapered rib 8a1 are integrally formed. Alternatively, the first camshaft member 81 may be configured by preparing two separate members respectively having the shaft portion 8b and the first tapered rib 8a1 and combining the two members.

An example of application of the cam mechanism 3 in the foregoing embodiment is not limited to NC rotary tables, but is applicable to any device that requires transmission of rotation between the cam shaft 8 and the roller gear 7. The cam mechanism 3 is also applicable to devices in which rotation is transmitted from the roller gear 7 to the cam shaft 8.

REFERENCE SIGNS LIST

1: NC rotary table, 2: motor, 3: cam mechanism, 4: rotary table, 6: base, 7: roller gear, 7a: turret, 7b: cam follower, 8:

camshaft, 8a: tapered rib, 8a1: first tapered rib, 8a2: second tapered rib, 8b: shaft portion, 81: first cam shaft member, 81b: first tapered rib forming portion, 82: second camshaft member, 82d: second tapered rib forming portion, 83: fastening member, 84: axial movement preventing member

The invention claimed is:

1. A cam mechanism comprising a base, a roller gear, and a camshaft, wherein:
   the roller gear and the camshaft are rotatably supported by the base;
   the roller gear has a turret and a plurality of cam followers mounted on a circumference of the turret;
   the cam shaft has a tapered rib having a first tapered rib and a second tapered rib, and a shaft portion;
   the first and second tapered ribs are each engaged with the cam followers;
   the first and second tapered ribs are configured to rotate relative to each other around a rotation axis of the shaft portion during adjustment of preload at which the first and second tapered ribs are pressed against the cam followers; and
   after the adjustment of the preload, the second tapered rib is fixed to the shaft portion, and the first and second tapered ribs are prevented from rotating relatively; wherein
   the camshaft has a first camshaft member, a second camshaft member, a fastening member, and an axial movement preventing member;
   the first camshaft member is a member in which the shaft portion and the first tapered rib are integrally formed;
   the second camshaft member is a member having the second tapered rib and a through hole;
   the first and second camshaft members are connected rotatably relative to each other around the rotation axis of the shaft portion by inserting the shaft portion into the through hole;
   the fastening member is configured to allow switching between fastening and unfastening of the shaft portion and the second camshaft member;
   the axial movement preventing member is configured to prevent the first and second tapered ribs in contact with each other from moving axially relative to each other; and
   the fastening member is positioned between the second camshaft member and the axial movement preventing member.

2. The cam mechanism of claim 1, wherein:
   the camshaft is rotatably supported at an end by a holder; and
   the holder is fixed to the base so as to allow adjustment of an axial position of the camshaft.

3. A method for manufacturing the cam mechanism of claim 1, comprising an engagement process and a preload adjustment process, wherein:
   in the engagement process, the first and second tapered ribs and the cam followers are rendered in an engaged state in which the first and second tapered ribs and the cam followers are engaged with each other; and
   in the preload adjustment process, the preload is adjusted based on torque applied to rotate the first and second tapered ribs relative to each other in the engaged state.

4. An NC rotary table comprising a motor, a cam mechanism, and a rotary table, wherein:
   the cam mechanism is the cam mechanism of claim 1;
   the motor is configured to allow rotation of the camshaft; and
   the rotary table is configured to rotate with rotation of the turret.

5. A method for manufacturing a camshaft, comprising a preparation process, a combination process, and a tapered rib forming process, wherein:
   in the preparation process, a first camshaft member having a shaft portion and a first tapered rib forming portion, and a second camshaft member having a through hole and a second tapered rib forming portion are prepared;
   in the combination process, the first and second camshaft members are combined by inserting the shaft portion into the through hole and bringing the first and second tapered rib forming portions into contact with each other; and
   in the tapered rib forming process, the first and second tapered ribs are continuously formed on the respective first and second tapered rib forming portions with the first and second tapered rib forming portions in contact with each other.

* * * * *